United States Patent [19]

Clair et al.

[11] Patent Number: 5,219,531
[45] Date of Patent: Jun. 15, 1993

[54] PRODUCTION OF CONCENTRATED AQUEOUS SOLUTIONS OF FERRIC CHLORIDE

[75] Inventors: Rene Clair, Martigues; Alain Gallet, Lavera, both of France

[73] Assignee: Atochem, Puteaux, France

[21] Appl. No.: 865,879

[22] Filed: Apr. 9, 1992

Related U.S. Application Data

[60] Division of Ser. No. 676,467, Mar. 26, 1991, Pat. No. 5,118,489, which is a continuation of Ser. No. 345,242, May 1, 1989.

[30] Foreign Application Priority Data

Apr. 29, 1988 [FR] France ................. 88 05799

[51] Int. Cl.$^5$ .............................. B01J 14/00
[52] U.S. Cl. ................... 422/129; 422/234; 422/211; 422/256
[58] Field of Search ............... 422/129, 234, 211, 224, 422/256, 260; 423/493, DIG. 1

[56] References Cited

U.S. PATENT DOCUMENTS

| | | | |
|---|---|---|---|
| 1,054,400 | 2/1913 | Dow et al. | 423/493 |
| 2,088,497 | 7/1937 | Tijmstra | 422/256 |
| 2,096,855 | 10/1937 | Ladd | 423/493 |
| 2,201,550 | 5/1940 | van Dijck et al. | 422/256 |
| 2,215,359 | 9/1940 | Livingston et al. | 422/256 |
| 2,852,339 | 9/1958 | Hill | 423/493 |
| 3,399,964 | 9/1968 | Michels et al. | 423/DIG. 1 |
| 3,682,592 | 8/1972 | Kovacs et al. | 423/488 |
| 3,873,678 | 3/1975 | McCormick et al. | 423/493 |
| 3,968,050 | 7/1976 | Riegel | 423/493 |
| 3,979,281 | 9/1976 | Gerhold | 422/256 |
| 4,066,748 | 1/1978 | Lietard et al. | 424/147 |
| 4,083,693 | 4/1978 | Hansen | 423/493 |
| 4,243,650 | 1/1981 | Tsao | 423/493 |
| 4,255,407 | 3/1981 | Puurunen | 423/DIG. 1 |
| 4,897,245 | 1/1990 | Hsia et al. | 422/211 |

FOREIGN PATENT DOCUMENTS 2410629 11/1977 France .
49-113798 10/1974 Japan .

OTHER PUBLICATIONS

Chemical Abstract No. 127078e.
Chemical Abstract No. 189260g.

Primary Examiner—Robert J. Warden
Assistant Examiner—Hien Tran
Attorney, Agent, or Firm—Burns, Doane, Swecker & Mathis

[57] ABSTRACT

Concentrated aqueous solutions of ferric chloride, directly useful as flocculating agents in a variety of water treatments, are prepared by (a) reacting chlorine, advantageously a stoichiometric amount of chlorine, with an aqueous solution of ferrous chloride in the presence of an aqueous solution of ferric chloride, in an essentially vertical reaction zone, with at least a major amount of the ferrous chloride solution being introduced to the upper section of such reaction zone, at least a major amount of the chlorine being introduced countercurrently to the base of such reaction zone, and the ferric chloride solution being introduced at at least one point intermediate such ferrous chloride solution/chlorine inlets, and (b) recovering final product aqueous solution of ferric chloride from the base of the reaction zone.

11 Claims, 1 Drawing Sheet

PRODUCTION OF CONCENTRATED AQUEOUS SOLUTIONS OF FERRIC CHLORIDE

This application is a divisional of application Ser. No. 07/676,467, filed Mar. 26, 1991 now U.S. Pat. No. 5,118,489, which is a continuation of application Ser. No. 07/345,242, filed May 1, 1989.

BACKGROUND OF THE INVENTION

1. Field of the Invention

The present invention relates to the preparation of ferric chloride and, more especially, to the preparation of ferric chloride by chlorination of aqueous solutions of ferrous chloride.

2. Description of the Prior Art

Ferric chloride is a known compound which is useful as a flocculating agent in water treatment. Compare, for example, Kirk-Othmer, *Encyclopedia of Chemical Technology*, 3rd edition, volume 24, pages 394–396 (1984) and volume 10, page 498 (1980).

The simplest process for the preparation of ferric chloride entails digesting iron with concentrated hydrochlorine acid; an aqueous solution containing approximately 36% by weight of ferrous chloride ($FeCl_2$) is thus obtained, and this is chlorinated to produce an aqueous solution of ferric chloride ($FeCl_3$) which analyzes by titration at approximately 41% by weight This 41% solution can be directly employed as a flocculating agent, and is the usual commercial form. A concentrated solution of $FeCl_2$ must be produced, because $FeCl_2$ and $FeCl_3$ can undergo partial hydrolysis during concentration by evaporation, to give HCl. The presence of HCl in $FeCl_3$ is a particular problem in water treatment. The above process also requires the use of concentrated hydrochloric acid.

U.S. Pat. No. 3,682,592 describes a process for producing ferric chloride in which the solution of ferrous chloride is contacted with oxygen.

U.S. Pat. No. 4,066,748 describes a process for preparing ferric chloride beginning with a solution of $FeC_2$ emanating from a descaling bath. This process requires both a concentration of the ferrous chloride as well as a two-step chlorination.

In Example 3, the '748 patent indicates the impossibility of chlorinating the ferrous chloride completely using the stoichiometric amount of chlorine when using a single reactor, or the requirement to employ an excess of chlorine to chlorinate all of the ferrous chloride In carrying out the reaction scheme detailed in Example 4 of the '748 patent, the chlorination of $FeCl_2$ to $FeCl_3$ is reported, but in two reactors, which are charged with a $FeCl_2/FeCl_3$ mixture.

SUMMARY OF THE INVENTION

Accordingly, a major object of the present invention is the provision of an improved process for the preparation of ferric chloride by reacting an aqueous solution of ferrous chloride with a stoichiometric amount of chlorine in a single reactor.

Briefly, the present invention features a process for the synthesis of ferric chloride from ferrous chloride and in the presence of ferric chloride, comprising introducing a major amount of the ferrous chloride aqueous solution at the top of an essentially vertical reactor, introducing a major amount of the chlorine at the base of the reactor, introducing a side stream of ferric chloride solution into the reactor, and recovering an aqueous solution essentially containing ferric chloride from the base of the reactor.

DETAILED DESCRIPTION OF THE PREFERRED EMBODIMENTS OF THE INVENTION

Figure 1:
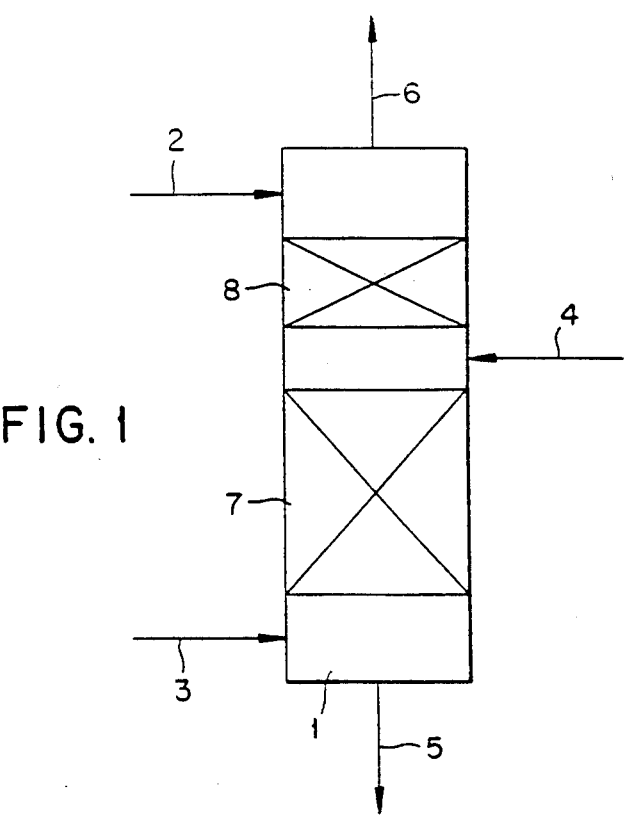
FIG. 1 is a schematic/diagrammatic illustration of one embodiment of the process/apparatus according to the present invention.

More particularly according to the present invention, the reactor ensures that the chlorine and ferrous and ferric chlorides are intimately contacted. The reactor is essentially vertical, that is to say, it is a vessel such that the smallest cylinder containing said vessel has a generatrix at least equal to the diameter of its circular cross-section, which generatrix is either vertical or approximately vertical.

For example, a reactor including a distillation column or an absorption column is employed. A column fitted with contacting means such as blades or packing rings, or with a number of such means, is advantageously employed.

The height of such column may range from 0.1 to 40 meters, and preferably from 2 to 20 meters. The ferrous chloride is in the form of an aqueous solution, as is the ferric chloride. A major amount of the ferrous chloride, namely, at least one-half of the solution, is introduced at the top of the reactor, and the remainder of the solution of ferrous chloride may be introduced at various levels, provided that this is always above the chlorine inlet, which is that inlet closest to the base of the reactor, i.e., geometrically, it is the lowest. The ferrous chloride is advantageously introduced as a single feedstream at the top of the reactor. The ferrous chloride is in the form of an aqueous solution consisting essentially of ferrous chloride, but also capable of already containing ferric chloride and/or hydrochloric acid. Liquid or gaseous chlorine, or a gas or a liquid containing chlorine, may be used. Most of the chlorine, namely, at least half of the feedstream containing the chlorine is introduced at the base of the reactor, and the remainder may be introduced at various levels along the height of the reactor.

The chlorine is advantageously introduced at the base of the reactor.

The inert material present in the chlorine and any unreacted chlorine are collected in the gaseous phase at the top of the reactor.

The reactor is charged with a side stream of ferric chloride. This feedstream is in the form of an aqueous solution essentially consisting of ferric chloride. By "side" is intended that the ferric chloride is introduced at a point intermediate the ferrous chloride feed to the top of the reactor and the chlorine feed at the bottom. It is also within the scope of this invention to use a solution containing up to 1% by weight of ferrous chloride The ferric chloride may also contain trace amounts of HCl. The ferric chloride may be introduced laterally at a number of points. It is advantageously introduced as a single charge and preferably into the upper third of the reactor.

A ferrous chloride solution and a ferric chloride solution containing not more than 1% by weight of HCl, expressed relative to the weight of the two solutions of ferrous and ferric chloride, are advantageously employed. This makes it possible to directly use the ferric chloride as a flocculating agent for a variety of water treatments.

The reactor advantageously operates at a moderate temperature, namely, at a temperature such that, together with the residence time, hydrolysis of the FeCl$_2$ does not occur.

Although the reaction between the ferrous chloride and the chlorine is complete, a ferrous chloride residence time of at least 10 seconds, and preferably less than 4 hours, is advantageously observed in the reactor.

It is not necessary to chlorinate all of the FeCl$_2$; ferric chloride specifications sometimes permit from 0.1 to 1% by weight of FeCl$_2$ in the ferric chloride solution. The use of an excess of chlorine relative to the stoichiometry is also within the scope of the invention.

The temperature of the reaction medium advantageously ranges from 50° to 100° C. Any particular pressure may be employed; for convenience, the operation is carried out at a pressure of from atmospheric pressure to 6 bars, and preferably from atmospheric pressure to 1 bar gauge.

A solution essentially containing ferric chloride is recovered at the base of the reactor. In a preferred embodiment of the invention, this solution is recycled to the reactor to constitute the side feedstream of ferric chloride. In a static mode, an amount of ferric chloride corresponding, in moles, to the amount of ferrous chloride introduced into the reactor is withdrawn prior to recycling. This withdrawal constitutes the output of ferric chloride. A heat exchanger may also be arranged in the recycle conduit before the return to the reactor, such as to remove the heat energy due to the ferrous chloride chlorination reaction. Some of the water may also be evaporated from the ferric chloride solution exiting the reactor, or from the solution which is withdrawn, or from the solution which is recycled into the reactor, or any combination of these solutions. This evaporation may be carried out using a conventional evaporator or, for example, by a decompression which thus causes the water to be vaporized.

If desired, the ferric chloride solution may be heated prior to evaporation.

In the embodiment shown in FIG. 1 of the drawings, a column 1, which comprises two packed beds 7 and 8, is charged with ferrous chloride via inlets 2 and 2', with chlorine via inlet 3 and with ferric chloride via inlet 4. The inerts present in the chlorine feedstream 3 are collected at outlet 6 and a solution of ferric chloride at outlet 5

Figure 2:
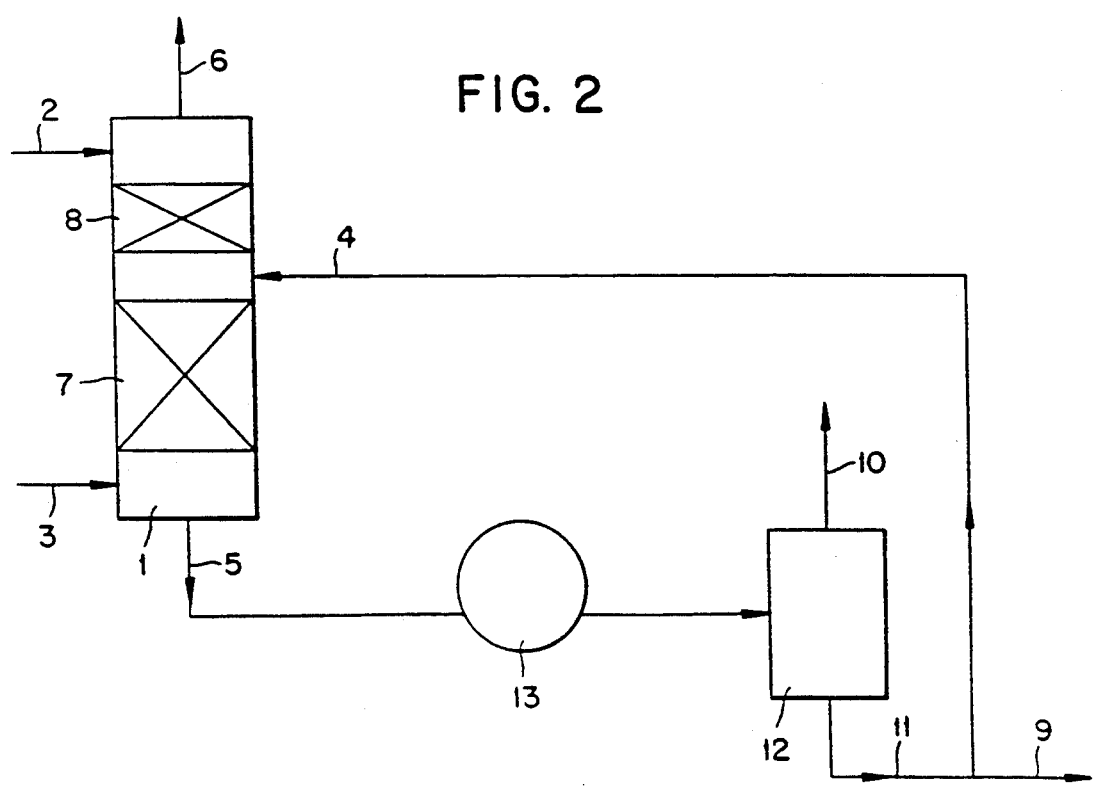
FIG. 2 is a schematic/diagrammatic illustration of another embodiment of the process/apparatus of this invention.

FIG. 2 shows another embodiment of the invention. (the reference numerals employed are the same as in FIG. 1.) The ferric chloride solution in line 5 is decompressed in vessel 12. The outlet liquid phase 11 is divided into a stream 9 which constitutes the final product ferric chloride solution and a stream 4 which is recycled to the reactor 1. The decompression vessel 12 is connected via line 10 to a stream ejector A heat exchanger 13 is incorporated in the process loop.

In order to further illustrate the present invention and the advantages thereof, the following specific examples are given, it being understood that same are intended only as illustrative and in nowise limitative.

EXAMPLE 1

An apparatus as shown in FIG. 2 was employed, in which the column 1 was constructed of glass, and had an inner diameter of 0.35 m and a packing 7 m in height in respect of section 7 and 3 m in respect of section 8.

A solution of 296 kg/h of FeCl$_2$ and 704 kg/h of water at 80° C. was introduced via inlet 2 and a flow rate of 82.7 kg/h of chlorine and 5 kg/h of inerts via inlet 3. The 5 kg/h of inerts were collected at outlet 6 and a ferric chloride solution, at 85° C., at outlet 5. The column 1 was operated at a pressure of 1.1 bars absolute. The ferric chloride was heated from 85° to 94° C. by the heat exchanger 13 and was then decompressed in vessel 12 to a pressure of 0.25 bars absolute. A solution containing 2,272 kg/h of FeCl$_3$ and 3,269 kg/h of water was recycled through line 4 and 379 kg/h of FeCl$_3$ diluted in 545 kg/h of water were withdrawn through outlet 9.

EXAMPLE 2

The procedure of Example 1 was repeated, but the column 1 was charged with ferrous chloride at a point 2' between the two beds 7 and 8, that is to say, at the same height as the recycle 4. To obtain the same conversion of FeCl$_2$ to FeCl$_3$ it was necessary to increase the chlorine flow rate to 88 kg/h, namely, 88 kg/h of chlorine and 5.32 kg/h of inerts. The excess chlorine and the inerts exited the reactor via outlet 6.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Apparatus for the production of concentrated aqueous solutions of ferric chloride, which comprises
   (i) means defining an essentially vertical reaction zone capable of reacting chlorine with an aqueous solution of ferrous chloride in the presence of a recycled aqueous solution of ferric chloride, said reaction zone comprising an inlet means for the ferrous chloride solution in an upper section thereof, an inlet means for chlorine at a base thereof, and an inlet means for a recycled concentrated liquid fraction comprising ferric chloride at a point intermediate such ferrous chloride solution/chlorine inlets,
   (ii) means for concentrating reaction product emanating from said reaction zone (i), said means (ii) being in fluid communication with the reaction zone,
   (iii) means for recycling a fraction of concentrated liquid phase comprising ferric chloride to said reaction zone, said means (iii) being in fluid communication with the ferric chloride inlet,
   (iv) means for recovering remaining fraction of concentrated liquid phase as a final product aqueous solution of ferric chloride,
   (v) a source of an aqueous solution of ferrous chloride in fluid communication with the ferrous chloride inlet; and
   (vi) a source of chlorine in fluid communication with the chlorine inlet.

2. The apparatus as defined by claim 1, said essentially vertical reaction zone comprising a gas/liquid contactor.

3. The apparatus as defined by claim 1, said ferric chloride solution inlet positioned in the upper one-third section of the reactor zone.

4. The apparatus as defined by claim 1, wherein said vertical reaction zone has a height from 0.1 to 40 meters.

5. The apparatus as defined by claim 1, wherein said vertical reaction zone has a height from 2 to 20 meters.

6. The apparatus as defined by claim 1, wherein said vertical reaction zone comprises multiple ferrous chloride solution inlets allowing ferrous chloride to be introduced at various levels above said chlorine inlet.

7. The apparatus as defined by claim 6, wherein a ferrous chloride solution inlet includes means for introducing at least one-half of said ferrous chloride solution at the top of the vertical reaction zone.

8. The apparatus according to claim 2, wherein the contactor comprises two contacting beds.

9. The apparatus according to claim 8, wherein each of the contacting beds contains contacting means.

10. The apparatus according to claim 1, wherein said reaction zone comprises a distillation column.

11. The apparatus according to claim 1, wherein said reaction zone comprises an absorption column.

* * * * *